(12) United States Patent
Glawion et al.

(10) Patent No.: US 10,094,182 B2
(45) Date of Patent: Oct. 9, 2018

(54) PRE-MOUNTED EXCHANGE INSERT OF A DRILL WASH DEVICE

(71) Applicant: EagleBurgmann Germany GmbH & Co. KG, Wolfratshausen (DE)

(72) Inventors: Michael Glawion, Geretsried (DE); Klaus Lang, Beuerberg (DE); Jens Hofmann, Sauerlach (DE); Rolf Johannes, Wolfratshausen (DE); Volkert Wanner, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 406 days.

(21) Appl. No.: 14/883,950

(22) Filed: Oct. 15, 2015

(65) Prior Publication Data

US 2017/0298702 A1    Oct. 19, 2017

(30) Foreign Application Priority Data

Oct. 16, 2014    (DE) .......................... 10 2014 221 000

(51) Int. Cl.
*E21B 21/02*    (2006.01)
*E21B 17/05*    (2006.01)
(Continued)

(52) U.S. Cl.
CPC .............. *E21B 21/02* (2013.01); *E21B 17/05* (2013.01); *E21B 21/01* (2013.01); *F16J 15/16* (2013.01)

(58) Field of Classification Search
CPC ................................... E21B 21/01; E21B 21/02
See application file for complete search history.

(56) References Cited

U.S. PATENT DOCUMENTS 3,581,834 A * 6/1971 Kellner .................. E21B 17/07
                                                                175/321
6,007,105 A * 12/1999 Dietle ................. F16L 27/0828
                                                                277/559
(Continued)

FOREIGN PATENT DOCUMENTS

EP              2281135 A1     2/2011
WO     WO-2009133115 A1    11/2009

OTHER PUBLICATIONS

Search Report in connection with priority Application No. DE 10 2014 221 000.3.

*Primary Examiner* — Caroline N Butcher
(74) *Attorney, Agent, or Firm* — Locke Lord LLP; Scott D. Wofsy; Alicia J. Carroll

(57) ABSTRACT

A pre-mounted exchange insert of a drill wash device is disclosed for connecting a stationary washpipe to a rotating washpipe, which includes a mechanical seal assembly with a stationary seal ring and a rotating seal ring, a first seal ring carrier on which the stationary seal ring is arranged, a second seal ring carrier on which the rotating seal ring is arranged, a connection component which is configured to connect the exchange insert to the stationary washpipe, and an adjusting mechanism operative in an axial direction with a screw connection for changing an axial length of the exchange insert, wherein the screw connection is connected to the second seal ring carrier to permit, in an axial direction, an adjustment of the second seal ring carrier, the mechanical seal assembly, and the first seal ring carrier relative to the connection component.

14 Claims, 8 Drawing Sheets

Figure 1:
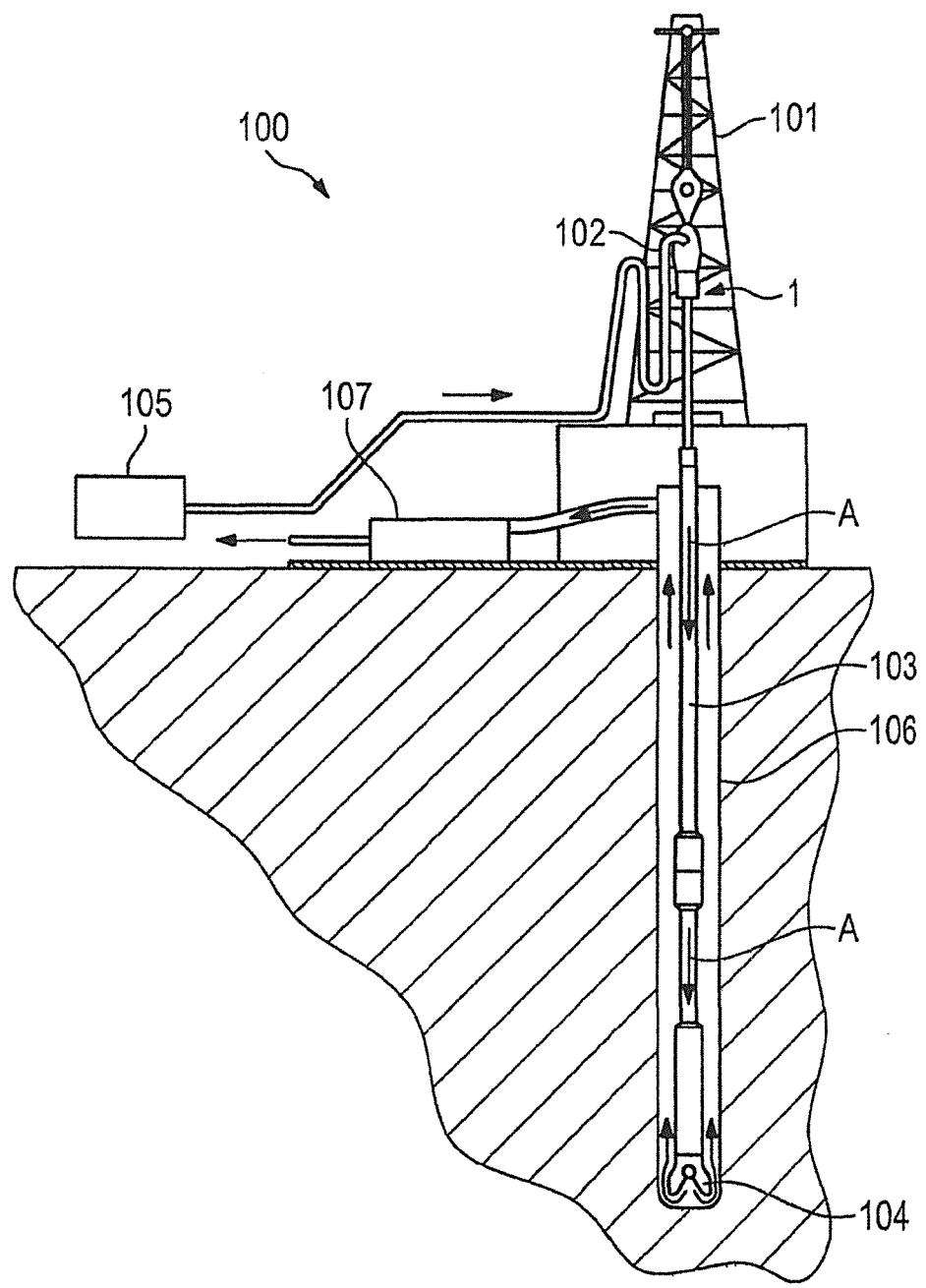

(51) Int. Cl.
*E21B 21/01* (2006.01)
*F16J 15/16* (2006.01)

(56) References Cited

U.S. PATENT DOCUMENTS 7,213,660 B2    5/2007  Martin
2006/0042789 A1*  3/2006  Kubala .................. E21B 17/05
                                                    166/88.4

* cited by examiner

PRE-MOUNTED EXCHANGE INSERT OF A DRILL WASH DEVICE

The present invention relates to a pre-mounted exchange insert of a drill wash device for connecting a stationary, non-rotating washpipe to a rotating washpipe which is inserted into a drill hole.

For drillings in the earth's crust, particularly for raw materials, so-called washpipe assemblies are used, in which a drill head is arranged at the end of a rotating pipe. A washing or flushing liquid is guided through the pipe from above downwards into the drill hole, the liquid then exiting at the drill head and being returned along the outer circumference of the rotating pipe to the earth's surface. A problematic issue in such drill hole arrangements is a sealing between a stationary washpipe and the rotating washpipe. To prevent any leaks at this sealing between stationary and rotating washpipe particularly under environmental aspects, conservative solutions are used as much as possible. A sealing solution is e.g. a series connection of a plurality of stationary seals, for instance stuffing-box seals or lip seals. In case of failure of one of said stationary seals the subsequent stationary seal will then ensure the sealing function. Due to the great loads arising during drilling the service life of the individual stationary seals is however very short. It is thus necessary to replace the stationary seals after a short period of time. This, however, leads to a standstill of the drilling rig and thus to considerable costs. Since the stationary seals have to be put individually over the pipe parts, the exchange efforts are also very great. Furthermore, EP 1 630 347 B1 discloses a sealing between a rotating and a stationary pipe which uses a mechanical seal. In principle, mechanical seals have the advantage of a longer service life as long as damage to the sliding surfaces can be avoided. To keep the sliding surfaces of said mechanical seal always in contact with one another, if possible, a spring element is provided that during operation applies a constant preload in axial direction to the seal rings. Due to the great loads arising during drilling the mechanical seal must however also be replaced after some time. To this end a nut-screw assembly is then provided for compressing the spring elements in axial direction so as to terminate the preload on the seal rings. It is only then that an exchange of the seal rings is possible. This exchange process is complicated and time-consuming. Furthermore, the seal rings are removed or mounted again individually, so that there is the risk of damage to the sliding surfaces during mounting. Here, particular attention must be paid that the sealing between rotating and stationary washpipe is arranged in a bell of a drilling tower at a height of several meters and that particularly external influences, such as weather and temperature, cannot have a negative impact on the exchange operation because drilling is performed especially at more and more inhospitable places, e.g. on the high seas and in cold regions of the earth. That is why the exchange must be carried out with utmost care despite possibly very adverse external circumstances so as to avoid damage to the sliding surfaces. This also leads to a long and complicated exchange process.

Furthermore, U.S. Pat. No. 4,557,489 discloses a sealing with seal rings which is pressure-compensated. For this purpose bores are either provided in the seal rings in radial direction, the bores ensuring pressure compensation relative to the outer circumference of the seal rings, or bores are provided in seal ring holders and lead to the outer circumference of the seal rings to provide pressure compensation. In case of damage to the seal, the seal rings must be replaced separately.

It is therefore the object of the present invention to provide a sealing between a rotating and a stationary washpipe which while being of a simple and inexpensive construction particularly permits a fast and safe exchange of the seal.

This object is achieved with a pre-mounted exchange insert comprising the features of claim 1. The sub-claims show preferred developments of the invention.

By comparison, the exchange insert of a drill wash device according to the invention for connecting a stationary washpipe to a rotating washpipe at a well or drill hole has the advantage that an exchange is possible in a fast and simple manner. In particular, it can be avoided according to the invention that the seal is damaged during the exchange operation. With the invention it is possible to use a mechanical seal which, by comparison with the series-connected stuffing boxes, has a much longer service life. Standstill times during the drilling operations can thereby be minimized. This is achieved according to the invention in that a pre-mounted exchange insert is used with a mechanical seal assembly which can be pre-mounted in a workshop and can then be exchanged as a complete unit at the drilling tower. According to the invention the exchange insert comprises—in addition to a stationary and rotating seal ring—two seal ring carriers as well as an adjusting mechanism with a screw connection so as to permit—after insertion of the exchange insert into the drill wash device—an elongation of the dimensions of the exchange insert in axial direction so as to establish a connection to the stationary and rotating washpipe. Furthermore, the pre-mounted exchange insert comprises a connection component for a connection of the exchange insert to the stationary washpipe. The axial adjustment is then carried out relatively between the connection component and the other components of the exchange insert. Hence, a change (elongation and shortening) of an axial length of the exchange insert can be accomplished. When the seal is damaged, the axial adjusting mechanism is again reset for disassembly, so that the axial length of the exchange insert is shortened and the exchange insert can be removed from the area between the stationary and rotating washpipe and can be replaced by a new pre-mounted exchange insert. The exchange operation just takes a few minutes, so that the relatively higher costs for the complete exchange insert can be more than compensated by the short exchange time. A further advantage of the use of an exchange insert is that new secondary sealing elements can always be used with each new exchange insert. This is not possible when the seal rings are just exchanged. This also results in reduced maintenance.

To enable a simple assembly and disassembly operation of the pre-mounted exchange insert in the drill wash device, the screw connection preferably comprises an external sleeve with an internal thread and an internal sleeve with an external thread. The internal sleeve is here preferably connected to the seal ring carrier of the stationary seal ring. Hence, the axial length of the pre-mounted exchange insert can be changed by way of a relative adjustment between the external sleeve and the internal sleeve via the thread, so that a safe placement of the exchange insert on the stationary and rotating washpipe is possible. Equally, a disassembly is possible by shortening the axial length of the exchange insert by way of a relative rotation between external sleeve and internal sleeve. Thus, assembly/disassembly can be carried out by a mechanic without any problems also under adverse weather conditions.

For a safe rotating entrainment the second seal ring carrier comprises at least one axially protruding projection for a torque transmission from the rotating washpipe to the second seal ring carrier.

Further preferably, the second seal ring carrier is configured in two parts with a first carrier part and a second carrier part, the second carrier part being an aligning ring. The aligning ring is provided for aligning the second seal ring carrier in circumferential direction. This is necessary because a rotational force is transmitted from the rotating washpipe via the second seal ring carrier onto the rotating seal ring.

Preferably, a form-fit connection is provided between the seal ring carrier of the rotating seal ring and the rotating washpipe, e.g. by way of projections which protrude on the seal ring carrier radially outwards and/or in axial direction and which engage into corresponding recesses on the rotating washpipe. An alignment in circumferential direction is thereby made possible in a fast and easy manner also under extremely difficult conditions.

The connection component preferably comprises a circumferential groove for a form-fit engagement with the stationary washpipe.

To avoid damage to the pre-mounted exchange insert during assembly or during transportation of the exchange insert, the exchange insert preferably comprises a transportation lock. The transportation lock comprises at least one spring element to exert a bias or preload on the mechanical seal assembly prior to a final assembly of the exchange insert. The preload is here exerted on the seal rings such that the sliding surfaces of the seal rings reliably abut on one another so as to avoid damage to the sliding surfaces. The transportation lock is here arranged between the connection component to the stationary washpipe and the first seal ring carrier for holding the stationary seal ring. The transportation lock is further configured such that in the end-mounted state of the exchange insert no preload is exerted on the mechanical seal during operation. This is e.g. achieved by providing spring elements which no longer exert a preload in the mounted state of the exchange insert, in which an axial length of the exchange insert has been increased by the axial adjusting mechanism. The spring elements can e.g. have a correspondingly short length so that in the end-mounted, axially extended state of the exchange insert no preload is exerted on the seal rings. Thanks to the dead weight of the seal ring and the weight of the first seal ring carrier the stationary seal ring nevertheless reliably lies on the rotating seal ring.

Further preferably, the first seal ring carrier on which the stationary seal ring is arranged has a shoulder on its inner circumference. The shoulder has the effect that the medium which is passed through the exchange insert under pressure exerts pressure on the seal rings via the shoulder, so that a reliable contact of the sliding surfaces of the seal rings is achieved.

To avoid a situation where the pressure on the seal rings during operation gets excessively strong, the rotating and the stationary seal ring are preferably provided with a respective bevel on the inner circumference. The bevel extends preferably from an inner circumference of the seal rings up to half a seal ring width. Particularly preferably, the bevels are equally provided on both seal rings.

For a particularly safe operation the internal sleeve of the adjusting mechanism is preferably provided on an inside with a guide surface for the rotating seal ring. The guide surface can e.g. be formed by providing an undercut, with a small gap existing between the wall of the undercut and the rotating seal ring so as to have no friction between the rotating seal ring and the sleeve during operation. In case of minor deflections the inside of the internal sleeve will then return the rotating seal ring back into the non-contacting normal position.

Further preferably, the adjusting mechanism of the exchange insert comprises an anti-rotation device. The anti-rotation device is preferably a threaded bolt, or the like. The anti-rotation device thereby ensures that a relative position between the external sleeve and the internal sleeve is reliably held during operation. In other words, after adjustment of the axial length of the exchange insert, which is carried out by rotation between external sleeve and internal sleeve, the position is secured by the anti-rotation device. Prior to disassembly the anti-rotation device must of course be released, so that a rotation between external sleeve and internal sleeve is possible again to permit a shortening of the axial length of the exchange insert.

The anti-rotation device is particularly preferably a threaded bolt with a spring-biased locking element, particularly a spring-biased ball, which is arranged on the tip of the threaded bolt. At a start position in which the exchange insert is not axially extended yet, the locking element engages into a first recess on the external sleeve. This defines a basic position of the pre-mounted exchange insert. During preassembly a mechanic can thus easily discern when the pre-mounted position has been reached. Furthermore, a second recess is provided on the external sleeve, in which the locking element locks in place when the exchange insert has reached the axially extended end state, i.e. the end assembly state, during assembly. Hence, there is also an indicator indicating a correct position for the achievement of the end position of the exchange insert in the mounted state. These measures considerably facilitate the assembly which, as has been mentioned, must be carried out partly under extremely difficult conditions because of external influences. Due to the spring-biased locking element, the locking in place during assembly and the locking out of place during disassembly take place automatically owing to the rotating operation between external sleeve and internal sleeve of the screw connection.

The anti-rotation device is preferably arranged on an arm connected to the internal sleeve, the external sleeve being arranged between the arm and the internal sleeve. The internal sleeve preferably has a length in axial direction that is greater than a length in the axial direction of the external sleeve. Furthermore, the internal sleeve preferably comprises a region extended in axial direction, which is configured for attachment of a tool for adjusting the screw connection.

Further preferably, the rotating and the stationary seal ring are each provided with a bandage. The seal rings can thereby withstand high pressure loads.

Furthermore, the present invention relates to a drill wash device with a pre-mounted exchange insert according to the invention.

Figure 2:
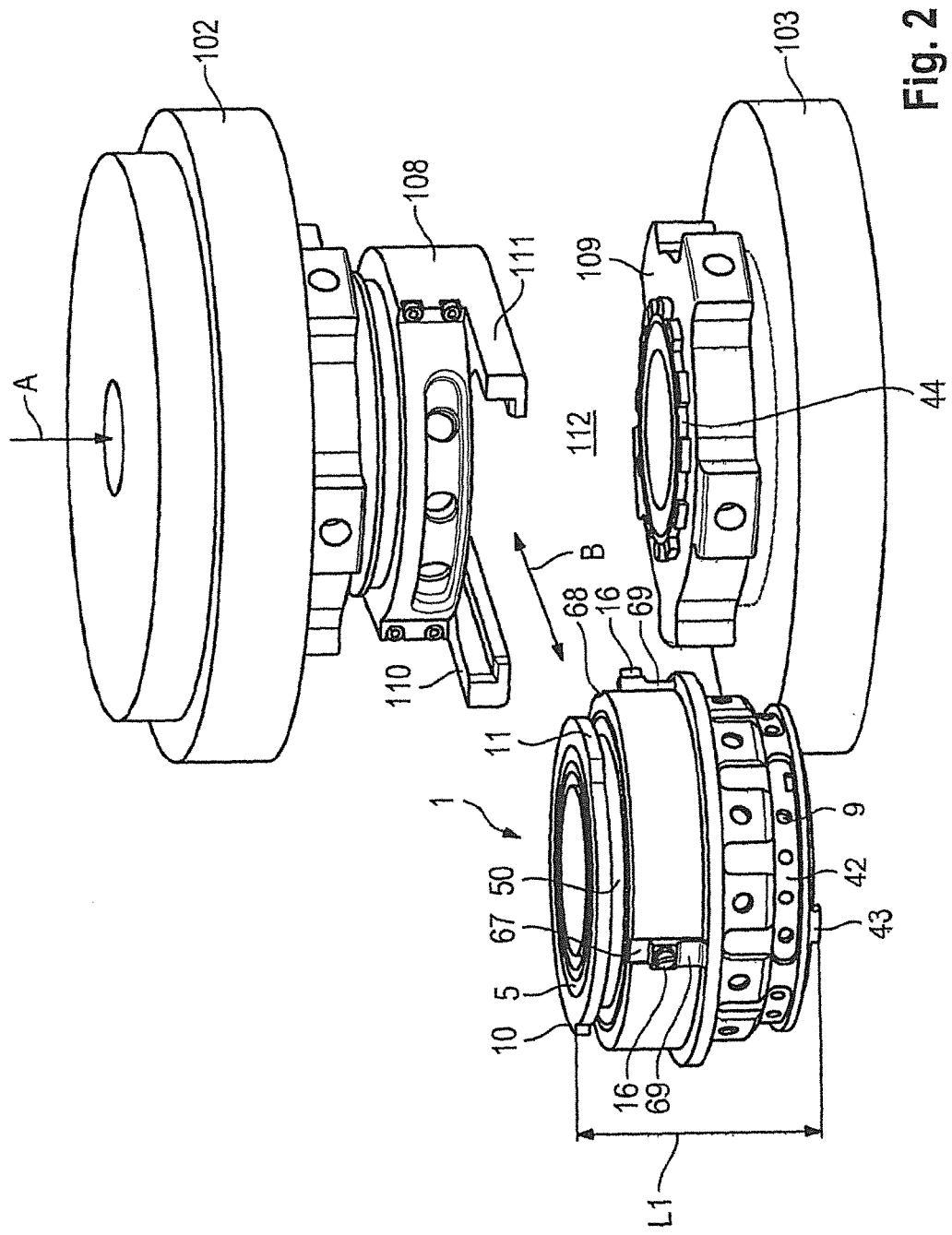
Figure 3:
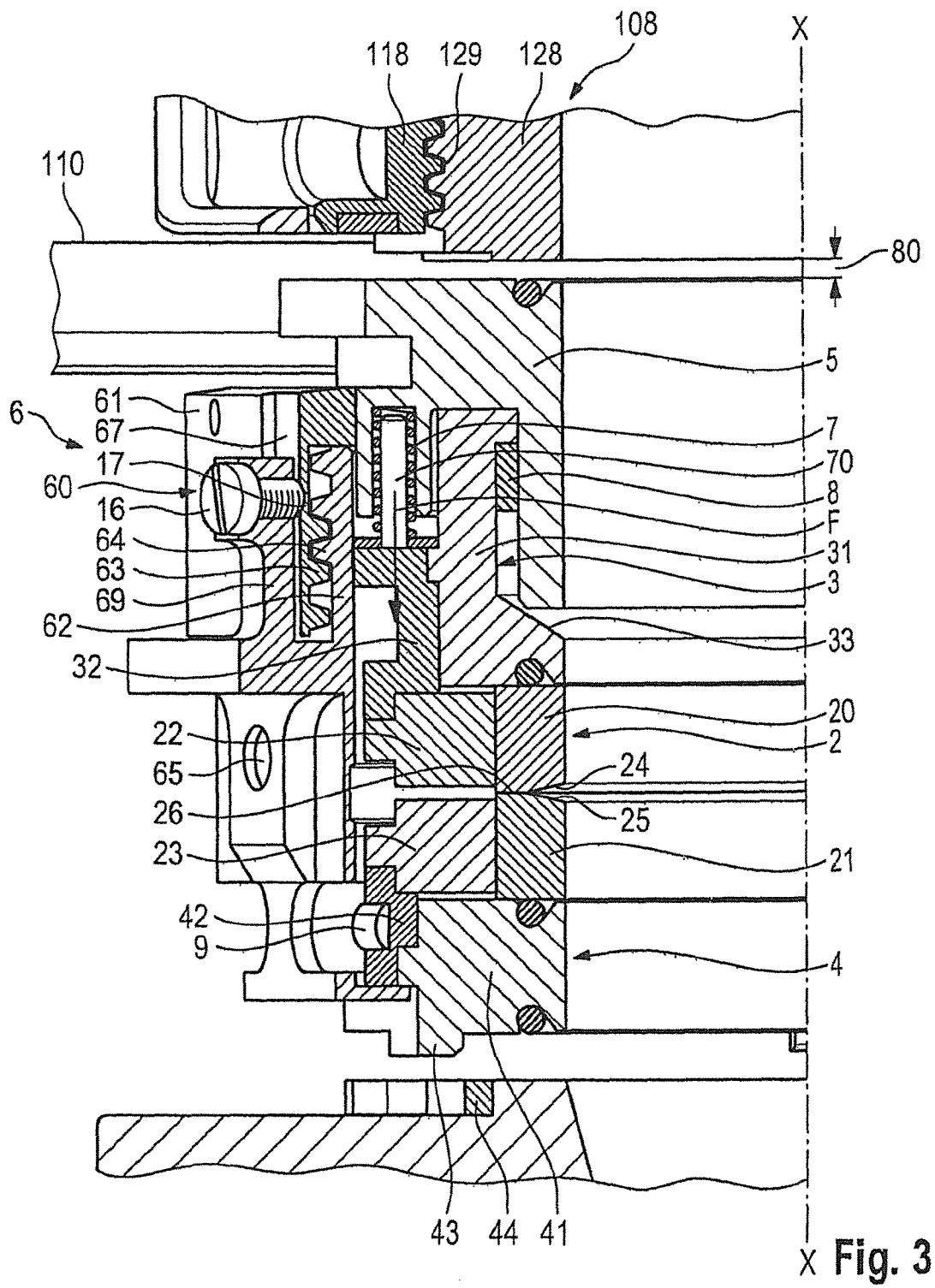
Figure 4:
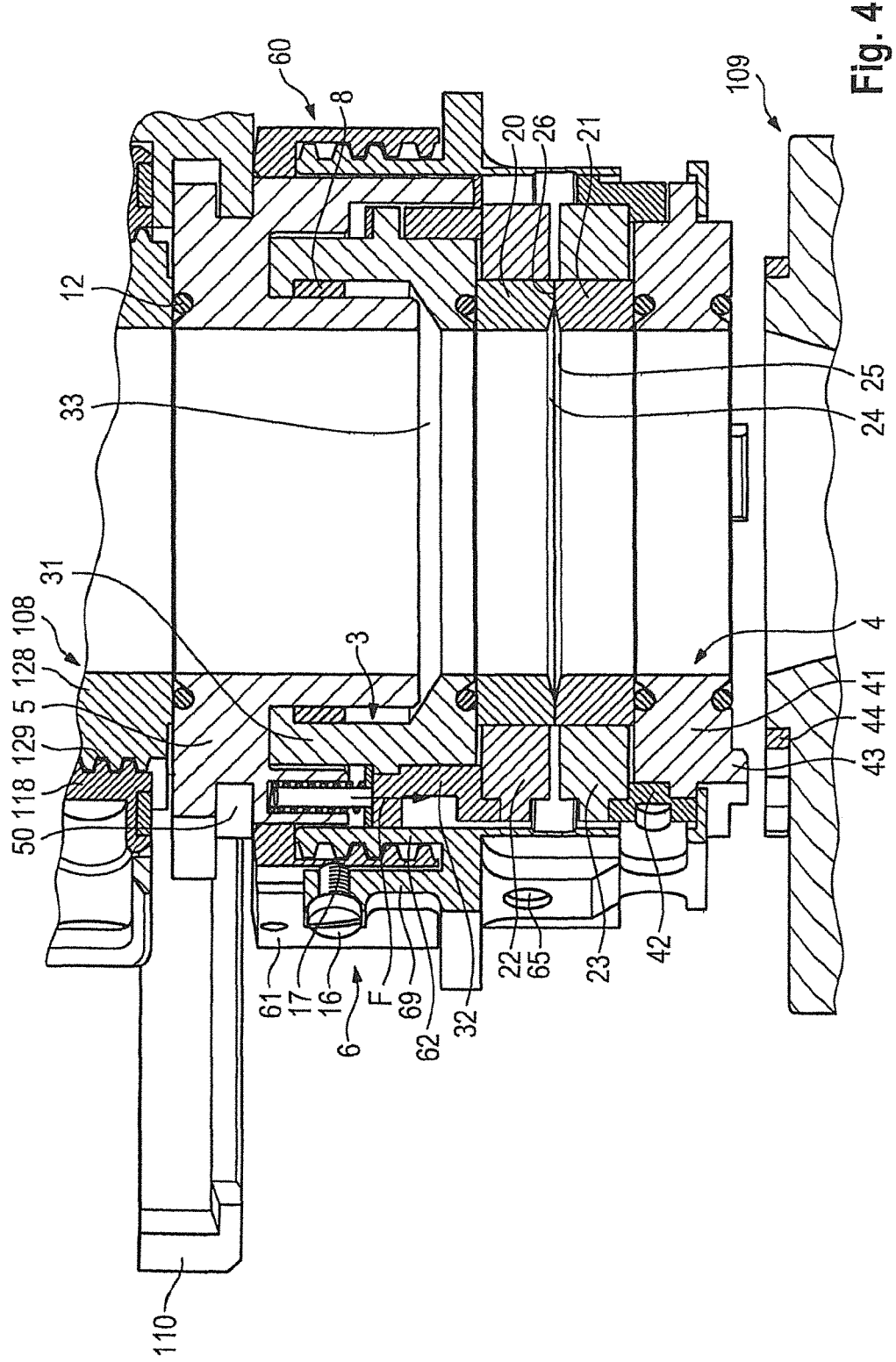
Figure 5:
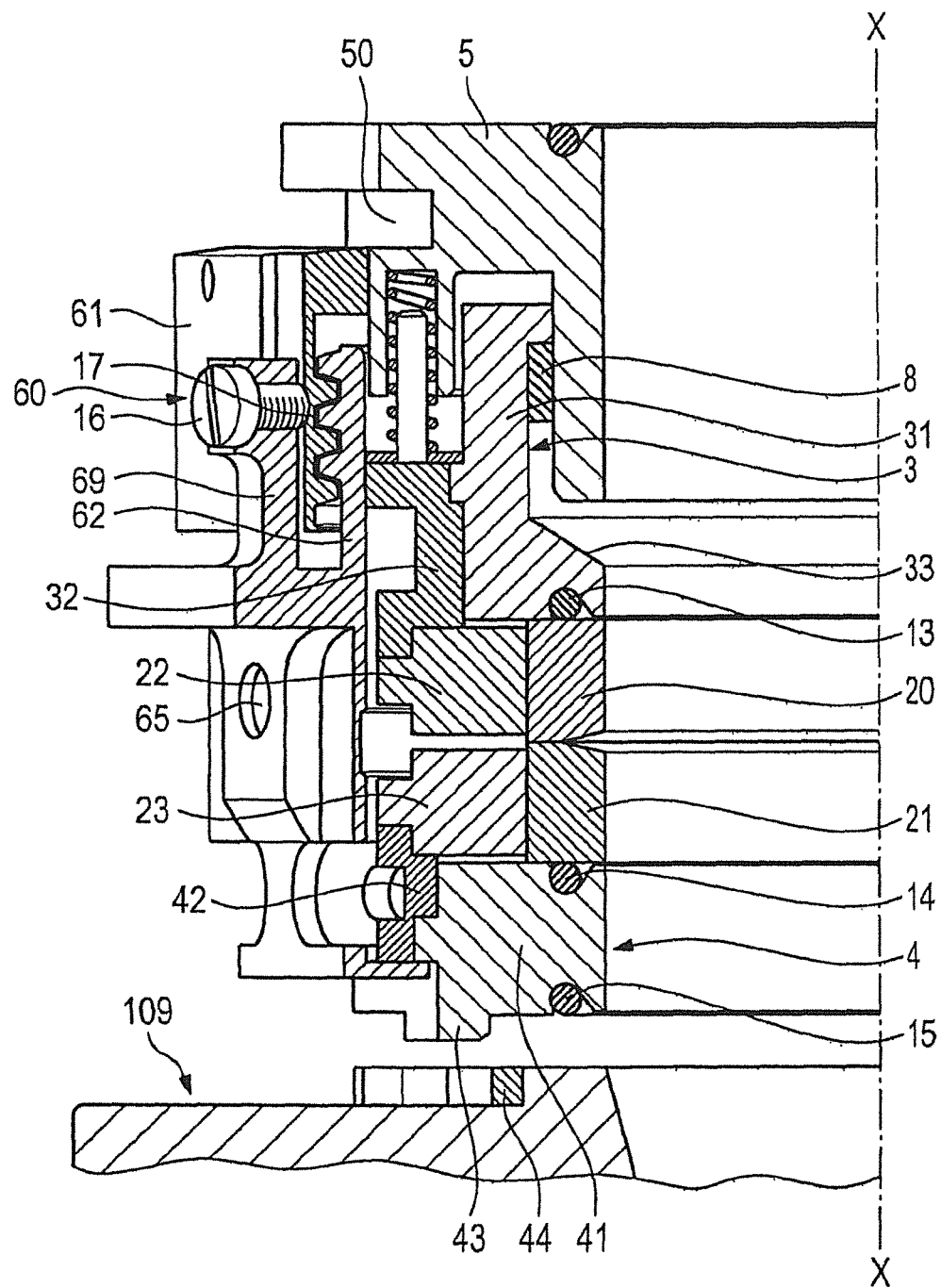
Figure 6:
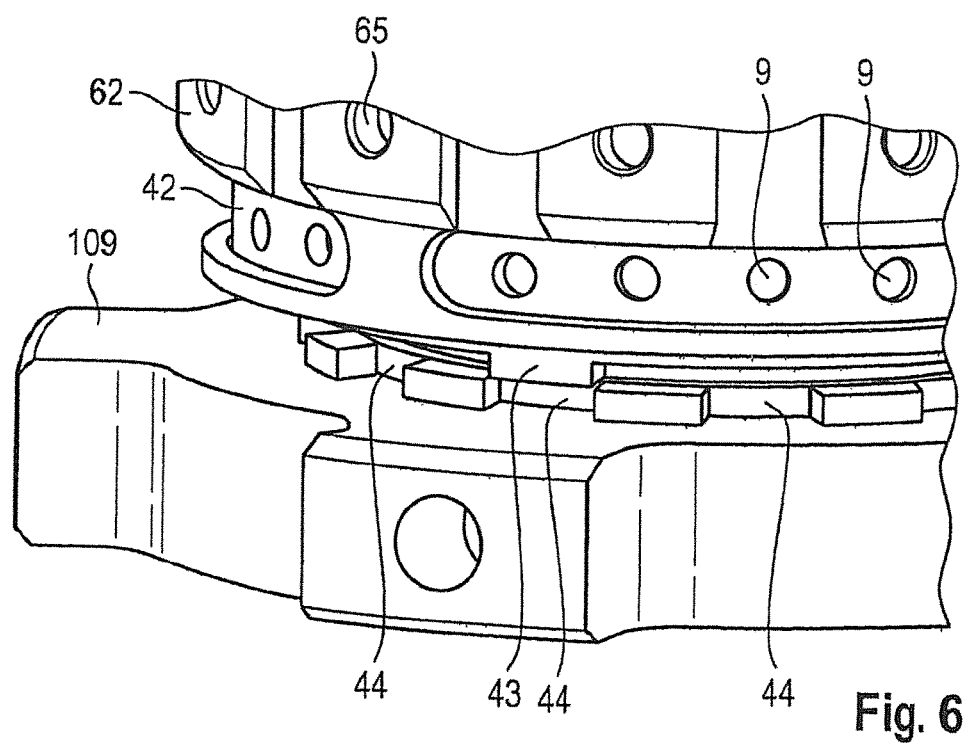
Figure 7:
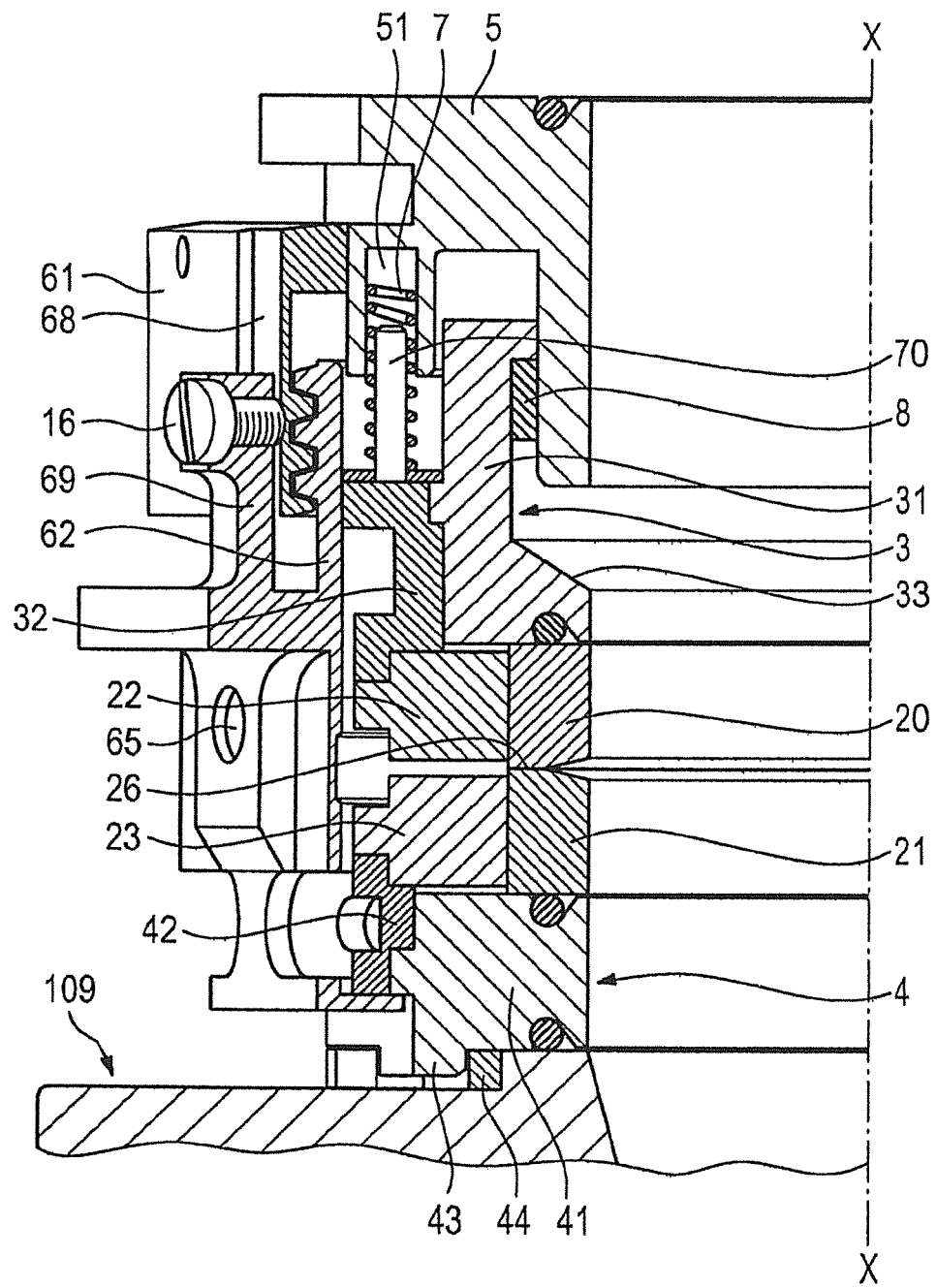
Figure 8:
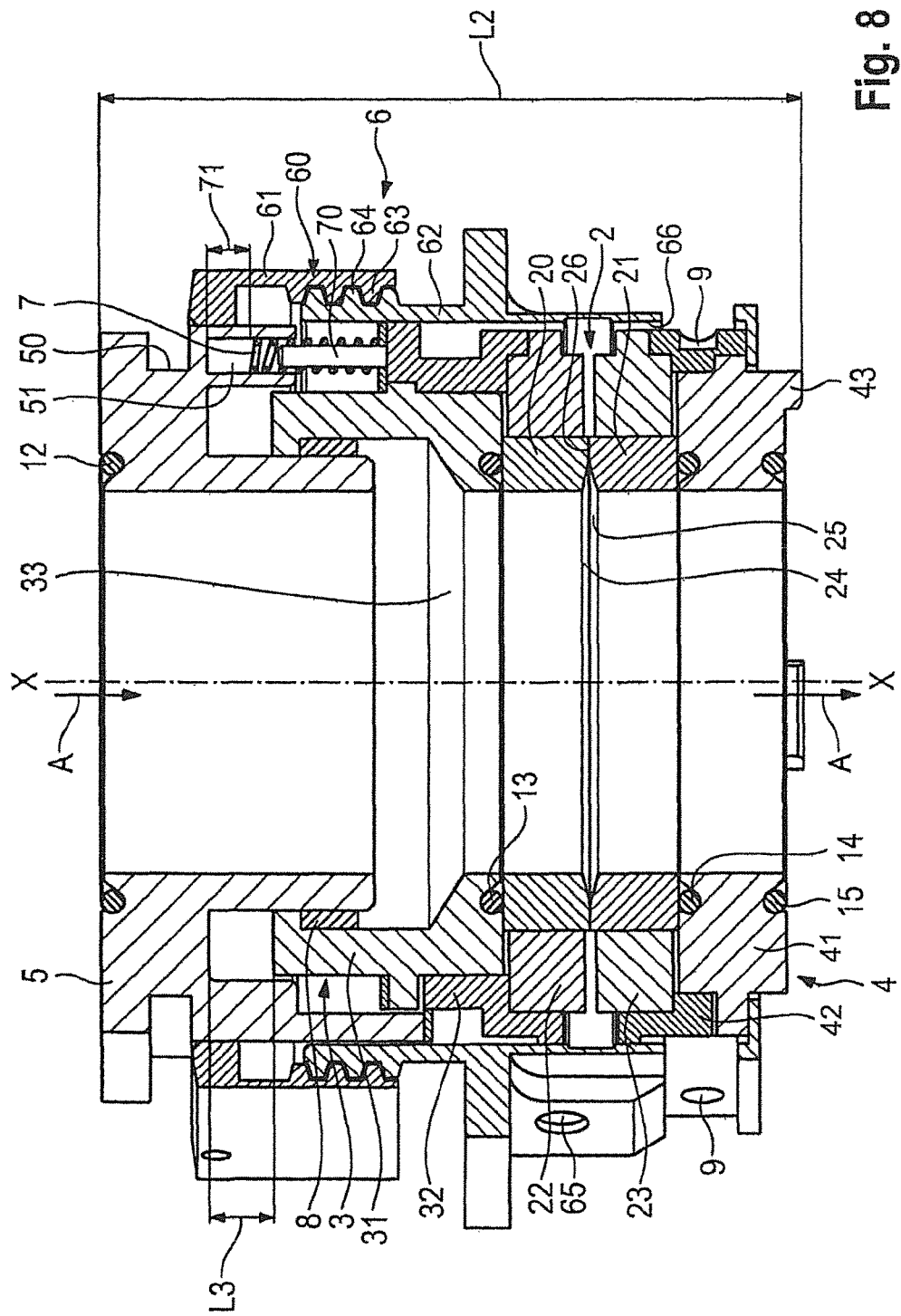

A preferred embodiment of the invention shall be described hereinafter in detail with reference to the accompanying drawing, in which:

FIG. 1 is a schematic illustration of a drill wash device in which a pre-mounted exchange insert according to the invention is used, FIG. 2 is a schematic, perspective illustration of an exchange operation of the exchange insert, FIG. 3 is a schematic partial sectional view of the exchange insert during a first mounting step in which the exchange insert is slid into the drill wash device;

FIG. 4 is a schematic partial sectional view of the exchange insert in which the exchange insert is connected to a stationary washpipe, FIG. 5 is a schematic partial sectional view of the exchange insert while being connected to a rotating washpipe, FIG. 6 is a schematic perspective view of an adjusting ring for aligning the exchange insert with respect to the rotating washpipe, FIG. 7 is a schematic partial sectional view of the exchange insert in the mounted state, and FIG. 8 is a schematic sectional view of the exchange insert in the mounted state, the stationary and the rotating washpipe being not shown for the sake of clarity.

An exchange insert 1 according to a preferred embodiment of the invention will now be described in detail with reference to FIGS. 1 to 8.

As can be seen in FIG. 1, the exchange insert 1 is used in a drill wash device 100. The drill wash device 100 comprises a drilling tower 101 and is configured to introduce a flushing or washing medium from above into a drill hole 106 (arrow A). The drill wash device 100 comprises a stationary washpipe 102 and a rotating washpipe 103 having a free end on which a drill head 104 is arranged. A washing medium is introduced by means of a pump 105 via the stationary washpipe 102 into the rotating washpipe 103 and exits on the drill head 104. The washing medium then flows on the outer circumference of the rotating washpipe 103 back to the surface into a separating device 107. In the separating device 107, rocks, or the like, that have been washed out of the drill hole 106 are separated from the washing medium which can then be recirculated.

According to the invention a pre-mounted exchange insert 1 is provided, which can be exchanged completely. This is schematically indicated in FIG. 2 by the double-headed arrow B. The pre-mounted exchange insert is here mounted in a space 112 between the stationary washpipe 102 and the rotating washpipe 103. A first adapter 108 is provided at the free end of the stationary washpipe 102, and a second adapter 109 is provided at the opposite free end of the rotating washpipe 103. Furthermore, the first adapter 108 has formed thereon first and second guide arms 110, 111 which allow an easy insertion of the pre-mounted exchange insert 1. To this end two guide elements 10, 11 are provided on the exchange insert 1 on a connection component 5. The guide elements 10, 11 are here lying with their bottom side on the rail-like guide arms 110, 111, so that the weight of the exchange insert 1 after the latter has been slid onto the guide arms 110, 111 is carried by said arms, and the mounting operation is facilitated. The connection component 5 further comprises a circumferential groove 50 for engagement with the guide arms 110, 111.

As is particularly apparent from FIGS. 3 and 8, the pre-mounted exchange insert 1 according to the invention comprises a mechanical seal assembly 2 with a stationary seal ring 20 and a rotating seal ring 26. A sealing gap 26 is formed between the two seal rings. The stationary seal ring 20 is enclosed by a first bandage 22 and the rotating seal ring 21 is enclosed by a second bandage 23.

Furthermore, a first bevel 24 is provided on the stationary seal ring 20 on the inner circumferential side thereof, and a second bevel 25 is provided on the rotating seal ring 21 in mirror-inverted fashion with respect to the sealing gap. The two bevels 24, 25 extend in radial direction of the exchange insert and reach up to the center of the seal rings 20, 21.

The exchange insert 1 further comprises a first seal ring carrier 3 which holds the stationary seal ring 20, and a second seal ring carrier 4 which holds the rotating seal ring 21. The first seal ring carrier 3 is configured in two parts, consisting of a first carrier part 31 and a second carrier part 32. Furthermore, a shoulder 33 is provided on the inner circumference of the first seal ring carrier 3.

The second seal ring carrier 4 is also configured in two parts comprising a first carrier part 41 and a second carrier part, which is an adjusting ring 42, and further comprises a plurality of projections 43 extending in axial direction X-X of the exchange insert 1. The projections 43 serve to transmit a torque from the driven rotating washpipe 103 via the second adapter 109 and the second seal ring carrier 4 to the rotating seal ring 21.

Furthermore, the pre-mounted exchange insert 1 comprises an adjusting mechanism 6 with a screw connection 60. The adjusting mechanism 6 comprises an external sleeve 61 with an internal thread 63 and an internal sleeve 62 with an external thread 64. The internal thread 63 and the external thread 64 engage one another and upon a relative rotation between the external sleeve 61 and the internal sleeve 62 the pre-mounted exchange insert is elongated in axial direction X-X of the adjusting mechanism 6. FIG. 2 shows a start length L1 of the pre-mounted exchange insert 1 in axial direction. FIG. 8 shows the fully extended axial length L2 which is longer by a length L3 than the start length L1.

The internal sleeve 62 covers the mechanical seal 2 in radial direction and it provides a guide surface 66 for the rotating seal ring 21 on a radial outside of the bandage 23. Furthermore, the internal sleeve 62 also holds the second seal ring carrier 4 via the adjusting ring 42 of the second seal ring carrier 4.

Furthermore, the exchange insert 1 according to the invention comprises a plurality of spring elements 7 which are arranged between the connection component 5 for a connection to the stationary washpipe 102 and the first seal ring carrier 3. Each spring element 7 is arranged around a pin 70 for guiding and positioning the spring elements. The spring elements 7 are arranged in pockets 51 in the connection component 5.

The spring elements 7 ensure that in the state in which the exchange insert is not end-mounted (FIGS. 2, 3 and 4) a force F is exerted via the first seal ring carrier 3 on the stationary seal ring 20, so that the stationary seal ring 20 reliably abuts on the rotating seal ring 21 and the sliding surfaces touch each other (cf. FIG. 4). In the end-mounted state which is shown in FIGS. 7 and 8, the spring elements 7 do however not exert any spring force on the mechanical seal 2. This is e.g. achieved by way of a corresponding design of a length of the springs 7, so that in the end-mounted state of the exchange insert 1 in the drill wash device 100 a spring distance 71 exists between an end of the spring elements 7 and the connection component 5, as shown in FIG. 8.

Hence, the spring elements 7 form a transportation lock which prior to a final end mounting of the exchange insert 1 exerts a constant preload in axial direction X-X on the mechanical seal.

Furthermore, a sealing element 8 is arranged between the connection component 5 and the first seal ring carrier 3. Furthermore, the exchange insert 1 comprises a first, second, third and fourth secondary sealing element 12, 13, 14, 15. The first secondary sealing element 12 seals between the connection component 5 and the stationary washpipe 102, the second secondary sealing element 13 seals between the first seal ring carrier 3 and the stationary seal ring 20, the third secondary sealing element 14 seals between the rotating seal ring 20 and the second seal ring carrier 4, and the fourth secondary sealing element 15 seals between the second seal ring carrier 4 and the second adapter 109 relative to the rotating washpipe 103.

The adjusting ring 42 of the second seal ring carrier which is rotatable from outside of the pre-mounted exchange insert 1 by means of a tool on openings 9 permits an alignment of the second seal ring carrier 4 in circumferential direction. This is necessary for allowing a torque transmission via the projections 53, which are protruding in axial direction X-X, from the second adapter 109 via the second seal ring carrier 4 to the rotating seal ring 21. This process can be seen in FIGS. 5 and 6.

The second adapter 109 comprises recesses 44 formed to conform to the projections 43, so that a form-fit connection is possible between the second adapter 109 and the adjusting ring 42.

Furthermore, an anti-rotation device 16 is provided for fixing a relative position of the adjusting mechanism 6 between the external sleeve 61 and the internal sleeve 62. The anti-rotation device 16 of this embodiment is a threaded bolt which fixes a relative position between the external sleeve 61 and the internal sleeve 62. The threaded bolt comprises a spring-biased ball which in the not yet end-mounted position locks into a first recess 67 on the outer circumference of the external sleeve 61 (FIG. 3). The anti-rotation device is here arranged on an arm 69 which is connected to the internal sleeve, so that the external sleeve 61 is arranged between the arm 69 and the internal sleeve (cf. FIGS. 3 and 4). In the fully end-mounted position (FIG. 7), the ball is locked into a second recess 68 on the external sleeve 61, which serves as an indicator which indicates that the end position of the axially elongated exchange insert is reached. The two recesses 67, 68 are arranged by about a quarter turn between internal sleeve and external sleeve on the circumference of the external sleeve 61. By locking the ball into the recesses 67, 68, a mechanic has—during the respective pre-mounting of the exchange insert—an indicator indicating the correct position of the components internal sleeve and external sleeve relative to each other and also in the end-mounted position by locking into the second recess 68. This permits a reliable mounting also under the most severe environmental conditions.

Since the exchange insert is pre-mounted according to the invention, the exchange insert can be fully pre-mounted without any problems in a workshop. All secondary sealing elements 12, 13, 14, 15 can here also be exchanged in a simple way. The transportation lock by means of the spring elements 7 ensures that during transportation and installation shortly before an end installation position is reached a preload is always exerted on the seal rings 20, 21, so that the sliding surfaces of the seal rings closely abut on one another, and damage to the sliding surfaces can be avoided. According to the invention a complete exchange of the exchange insert with mechanical seal assembly can thereby be provided in a simple and fast way. Hence, during each exchange of the exchange insert new secondary sealing elements can be used, resulting in reduced maintenance and a respectively longer useful life of the exchange insert. In the case of a new exchange insert each of the spring elements 7 can also be replaced, if necessary. Since the spring elements 7 are arranged in the pockets 51, they are very well protected from the pumped medium, so that an exchange of the spring elements 7 is often not required.

The exchange operation will now be described in detail. After the exchange insert to be exchanged has been removed from the drill wash device 100, a new pre-mounted exchange insert 1 is inserted into the drill wash device 100, as outlined in FIG. 2. The new pre-mounted exchange insert 1 is pushed on the circumferential groove 50 and the guide elements 10, 11 onto the two guide arms 110, 111, so that after a short push path the complete weight of the exchange insert 1 is carried by the guide arms 110, 111. This considerably facilitates an assembly of the exchange insert which is normally carried out at a certain height in the drilling tower 101 and must also be executed under very extreme weather conditions. Now, a mechanic must just push the pre-mounted exchange insert 1 along the guide arms 110, 111 into the assembly position. This inserted position is illustrated in FIG. 3. A first distance 80 is arranged between a face of the connection component 5 and a face of the first adapter 108, which is arranged on the stationary washpipe 102 (cf. FIG. 3).

In a next step, this first distance 80 is eliminated in that the first adapter 108 is extended in axial direction X-X of the exchange insert (FIG. 3). Here, the first adapter 108 comprises an outer ring 118 and an inner ring 128 between which a thread 129 exists, so that the inner ring 128 gets into contact with the connection component 5 by rotating at least one of the rings. This position is shown in FIG. 4. A connection is thereby established between the pre-mounted exchange insert 1 and the stationary washpipe 102 via the first adapter 108. Since the connection is static, the first secondary sealing element 12 is adequate for sealing. The axial length L1 of the pre-mounted exchange insert has not been changed yet.

In a next step a connection is now established between the pre-mounted exchange insert 1 and the rotating washpipe 103. To this end the adjusting mechanism 6 is operated in that the internal sleeve 62 is rotated relative to the external sleeve 61. The internal sleeve 62 also comprises a portion which is exposed to the outside and in which plural recesses 65 are provided for the attachment of a tool. The internal sleeve 62 is here rotated relative to the external sleeve 61 until the position shown in FIG. 5 is reached. In this position a final connection has not been established yet between the pre-mounted exchange insert 1 and the second adapter 109 on the rotating washpipe 103, but an alignment of the torque transmitting mechanism must still be carried out between the second adapter 109 and the second seal ring carrier 4. To this end the adjusting ring 42 is rotated in circumferential direction, which is also permitted by means of a tool which can be attached from the outside to the adjusting ring 42. The alignment is of such a type that the projections 43 of the second seal ring carrier 4 are arranged over the corresponding recesses 44 of the second adapter 109, as shown in FIG. 6. After the alignment has been made, the internal sleeve 62 of the adjusting mechanism 6 is further rotated relative to the external sleeve 61, so that a further elongation of the exchange insert 1 is carried out in axial direction X-X until the connecting end position, which is shown in FIGS. 7 and 8, is reached (axial length L2).

FIG. 8 also shows the pre-mounted exchange insert in the connecting end position without showing the first and second adapter 108, 109 of the stationary and rotating washpipe for reasons of clarity.

Owing to the axial elongation of the exchange insert 1 the spring elements 7 can relax completely, so that the spring distance 71 plotted in FIG. 8 exists between the free end of the spring element 7 and the connection component 5. During operation the pressure on the seal rings is then built up via the shoulder 33. The spring elements may also be designed such that there is no spring distance from the connection component 5, but that a spring force is no longer exerted between connection component 5 and first seal ring carrier 4.

The spring elements 7 are here arranged in correspondingly formed pockets 51 in the connection component 5.

As a last step, the anti-rotation device 16 is then activated for fixing a relative position between the external sleeve 61 and the internal sleeve 62 of the adjusting mechanism 6. Here, the ball of the anti-rotation device locks in place in the second recess 68. Hence, the mechanic possesses an indicator which indicates that the exchange insert has been extended to the correct axial length L2. Subsequently, the drill wash device 100 is again ready for use.

During operation a pressure is then exerted via the shoulder 33 at the first seal ring carrier 3 on the seal rings, so that a reliable sealing is possible at the sealing gap 26. Depending on the application, the desired pressure level can here be configured by changing the length of the bevels 24, 25 in the radial direction of the seal rings. In the end-mounted position, the exchange insert 1 thereby has an axial length which is extended by length L3, starting from the axial length L1 (FIG. 2) to the axial length L2 (FIG. 8).

Owing to the inventive idea of providing a pre-mounted exchange insert with a mechanical seal assembly 2, it is thereby possible to make a fast and reliable exchange, also under adverse ambient conditions. Furthermore, the exchange insert 1 can permit the use of seal rings as a seal in a drill wash device 100, so that by comparison with the prior art one achieves a much longer service life of the seal between rotating and stationary washpipe. The exchange insert can here be handled by one single mechanic.

Owing to the provision of the circumferential groove 50 on the connection component 5 an incorrect assembly is virtually also ruled out. To bring the pre-mounted exchange insert 1 into the end position, two threaded adjusting mechanisms have just to be adjusted, one on the first adapter 108 on the stationary washpipe 102, and a second one on the exchange insert 1 (adjusting mechanism 6). This process can also be performed under very adverse environmental conditions. Furthermore, damage to the seal rings during the exchange operation can be reliably avoided as the spring elements 7 forming the transportation lock exert a preload on the seal rings until shortly before the final mounting position is reached. The handling of individual seal rings is also not required, which in the prior art often leads to severe damage to the seal rings with a correspondingly reduced service life of the seal rings mounted in this way.

LIST OF REFERENCE NUMERALS 1 exchange insert
2 mechanical seal assembly
3 first seal ring carrier
4 second seal ring carrier
5 connection component
6 adjusting mechanism
7 spring element
8 sealing element
9 opening
10, 11 guide elements
12-15 secondary sealing elements
16 anti-rotation device
17 preloaded locking element
20 stationary seal ring
21 rotating seal ring
22 first bandage
23 second bandage
24 first bevel
25 second bevel
26 sealing gap
31 first carrier part
32 second carrier part
33 shoulder
41 first carrier part
42 adjusting ring
43 projection
44 recess
50 circumferential groove
51 pocket
60 screw connection
61 external sleeve
62 internal sleeve
63 internal thread
64 external thread
65 recess
66 guide surface
67 first recess
68 second recess
69 arm
70 pin for positioning
71 spring distance
80 first distance
100 drill wash device
101 drilling tower
102 stationary washpipe
103 rotating washpipe
104 drill head
105 pump
106 drill hole
107 separating device
108 first adapter
109 second adapter
110, 111 guide arms
112 space
118 outer ring
128 inner ring
129 thread

The invention claimed is:

1. A pre-mounted exchange insert of a drill wash device for connecting a stationary washpipe to a rotating washpipe of a drill hole, comprising:
a mechanical seal assembly with a stationary seal ring and a rotating seal ring;
a first seal ring carrier on which the stationary seal ring is arranged;
a second seal ring carrier on which the rotating seal ring is arranged;
a connection component which is configured to connect the exchange insert to the stationary washpipe;
an adjusting mechanism operative in an axial direction with a screw connection for changing an axial length of the exchange insert, wherein the screw connection is connected to the second seal ring carrier to permit, in the axial direction, an adjustment of the second seal ring carrier, the mechanical seal assembly and the first seal ring carrier relative to the connection component; and
a transportation lock with at least one spring element which, before a final assembly of the pre-mounted exchange insert, exerts a preload on the mechanical seal assembly, and no longer exerts a preload on the mechanical seal assembly when the exchange insert is in an end-mounted state.

2. The exchange insert according to claim 1, wherein the screw connection comprises an external sleeve with an internal thread and an internal sleeve with an external thread.

3. The exchange insert according to claim 2, wherein the adjusting mechanism comprises an anti-rotation device to fix a relative position between the external sleeve and the internal sleeve.

4. The exchange insert according to claim 3, wherein the anti-rotation device comprises a threaded bolt with a locking element which is spring-loaded on a tip of the threaded bolt and which in a pre-mounted position locks into a first recess on the external sleeve and in an end-mounted position locks into a second recess on the external sleeve.

5. The exchange insert according to claim 3, wherein the anti-rotation device is arranged on an arm which is connected to the internal sleeve, wherein the external sleeve is arranged between the arm and the internal sleeve.

6. The exchange insert according to claim 5, wherein the internal sleeve has a length in the axial direction that is greater than a length in the axial direction of the external sleeve.

7. The exchange insert according to claim 6, wherein the internal sleeve comprises a portion which is elongated in axial direction and which is configured for attachment of a tool.

8. The exchange insert according to claim 1, wherein the second seal ring carrier comprises at least one projection protruding in the axial direction for torque transmission from the rotating washpipe to the second seal ring carrier.

9. The exchange insert according to claim 8, wherein the second seal ring carrier comprises an aligning ring to align the second seal ring carrier in a circumferential direction.

10. The exchange insert according to claim 1, wherein the connection component comprises a circumferential groove for a form-fit engagement with the stationary washpipe.

11. The exchange insert according to claim 1, wherein the transportation lock is arranged between the connection component and the first seal ring carrier.

12. The exchange insert according to claim 1, wherein the first seal ring carrier comprises a shoulder arranged on an inner circumference thereof.

13. The exchange insert according to claim 1, wherein at least one of the stationary seal ring and the rotating seal ring comprises a bevel on an inner circumference thereof.

14. The exchange insert according to claim 1, wherein an inside of an inner sleeve of the adjusting mechanism comprises a guide surface for the rotating seal ring.

\* \* \* \* \*